United States Patent
Chitti et al.

(10) Patent No.: US 12,114,363 B2
(45) Date of Patent: Oct. 8, 2024

(54) METHODS FOR BALANCING RESOURCES UTILIZED IN RANDOM-ACCESS PROCEDURES

(71) Applicant: Telefonaktiebolaget LM Ericsson (publ), Stockholm (SE)

(72) Inventors: Krishna Chitti, Secunderabad Telangana (IN); Andreas Cedergren, Bjärred (SE); Robert Mark Harrison, Grapevine, TX (US); Zhipeng Lin, Nanjing Jiangsu (CN); Jonas Sedin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 325 days.

(21) Appl. No.: 17/765,111

(22) PCT Filed: Nov. 5, 2020

(86) PCT No.: PCT/SE2020/051064
§ 371 (c)(1),
(2) Date: Mar. 30, 2022

(87) PCT Pub. No.: WO2021/091464
PCT Pub. Date: May 14, 2021

(65) Prior Publication Data
US 2022/0386381 A1 Dec. 1, 2022

Related U.S. Application Data

(60) Provisional application No. 62/931,916, filed on Nov. 7, 2019.

(51) Int. Cl.
*H04W 74/0833* (2024.01)
*H04W 74/00* (2009.01)

(52) U.S. Cl.
CPC ..... *H04W 74/0833* (2013.01); *H04W 74/004* (2013.01)

(58) Field of Classification Search
CPC .................. H04W 74/0833; H04W 74/004
(Continued)

(56) References Cited

U.S. PATENT DOCUMENTS 11,805,555 B2 * 10/2023 Agiwal ................ H04L 5/0053
2020/0245373 A1 * 7/2020 Xiong ............... H04W 74/0833
(Continued)

FOREIGN PATENT DOCUMENTS

WO 2020060466 A1 3/2020
WO 2020222481 A1 11/2020

OTHER PUBLICATIONS

"Discussion on channel structure for 2-step RACH", 3GPP TSG RAN WG1 #96bis, R1-1904059, Xi'an, China, Apr. 8-12, 2019, pp. 1-10.
(Continued)

*Primary Examiner* — Nghi H Ly
(74) *Attorney, Agent, or Firm* — Murphy, Bilak & Homiller, PLLC

(57) ABSTRACT

Embodiments include methods for user equipment (UE) random access to a cell in a wireless network. Such methods include selecting one of a plurality of available random-access preambles and mapping the selected random-access preamble to one of a plurality of available physical uplink shared channel (PUSCH) resource units (PRUs) based on a mapping constraint. In the mapping constraint, one or more of the available PRUs are not used for the mapping and an integer number of the available random-access preambles are mapped to each of the available PRUs that are used for the mapping. Such methods also include transmitting the selected random-access preamble on a random access chan-
(Continued)

nel (RACH) and transmitting a data message on the PRU mapped to the selected random-access preamble. Other embodiments include complementary methods for a network node, as well as UEs and network nodes configured to perform such methods.

25 Claims, 7 Drawing Sheets

(58) Field of Classification Search
USPC .............. 370/329, 328, 338, 341, 345, 350
See application file for complete search history.

(56) References Cited

U.S. PATENT DOCUMENTS

2020/0366451 A1* 11/2020 Lei .................... H04W 74/0833
2021/0051707 A1* 2/2021 Rastegardoost ...... H04L 5/0051

OTHER PUBLICATIONS

"Discussion on channel structure for Two-Step RACH", 3GPP TSG RAN WG1 #96bis, R1-1904584, Xi'an, China, Apr. 3-12, 2019, pp. 1-5.

"On Channel Structure for 2-step RACH", 3GPP TSG RAN WG1 #96bis, R1-1905051, Xi'an, China, Apr. 8-12, 2019, pp. 1-12.

"3GPP TS 36.213 V15.7.0", 3rd Generation Partnership Project; Technical Specification Group Radio Access Network; Evolved Universal Terrestrial Radio Access (E-UTRA); Physical layer procedures (Release 15), Sep. 2019, pp. 1-551.

"3GPP TS 36.321 V15.7.0", 3rd Generation Partnership Project; Technical Specification Group Radio Access Network; Evolved Universal Terrestrial Radio Access (E-UTRA); Medium Access Control (MAC) protocol specification (Release 15), Sep. 2019, pp. 1-134.

"Channel Structure for Two-Step RACH", 3GPP TSG-RAN WG1 Meeting #98bis, R1-1911405, Chongqing, P.R. China, Oct. 14-20, 2019, pp. 1-9.

"Discussion on channel structure for 2-step RACH", 3GPP TSG RAN WG1 #96bis, R1-1904357, Xi'an, China, Apr. 8-12, 2019, pp. 1-4.

"Discussion on Channel Structure for 2-step RACH", 3GPP TSG RAN WG1 Meeting #98bis, R1-1910574, Chongqing, China, Oct. 14-20, 2019, pp. 1-12.

"On Channel Structure for 2-step RACH", 3GPP TSG RAN WG1 #98bis, R1-1910987, Chongqing, China, Oct. 14-20, 2019, pp. 1-9.

"Remaining issues of msgA channel structure", 3GPP TSG RAN WG1 #98bis, R1-1910002, Chongqing, China, Oct. 14-20, 2019, pp. 1-8.

* cited by examiner

METHODS FOR BALANCING RESOURCES UTILIZED IN RANDOM-ACCESS PROCEDURES

TECHNICAL FIELD

The present invention generally relates to wireless communication networks, and particularly relates to improvements in random-access techniques employed by user equipment (UEs) to access cells in such networks.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer provides resources for transferring data over transport channels via the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe includes two consecutive slots, each of which includes $N^{DL}_{symb}$ OFDM symbols comprised of $N_{sc}$ OFDM subcarriers. Exemplary values of $N^{DL}_{symb}$ can be 7 (with normal CP) or 6 (with extended-length CP) for subcarrier spacing (SCS) of 15 kHz. $N_{sc}$ is configurable based upon available channel bandwidth.

A particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot, where $N^{RB}_{sc}$ is 12 for 15-kHz SCS.

An exemplary LTE FDD uplink (UL) radio frame can be arranged in a manner similar to the exemplary FDD DL radio frame shown in FIG. 3. Using terminology consistent with the above description, each UL slot includes $N^{UL}_{symb}$ OFDM symbols, each of which includes $N_{sc}$ OFDM subcarriers.

In general, a physical channel corresponds a set of resource elements carrying information that originates from higher layers. Downlink (DL, i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

PDSCH is the main physical channel used for unicast downlink data transmission, but also for transmission of RAR (random access response), certain system information blocks, and paging information. PBCH carries the basic system information (SI) required by the UE to access the network. PDCCH is used for transmitting downlink control information (DCI) that carries scheduling information for DL messages on PDSCH and grants for UL transmission on PUSCH, among other information.

Uplink (UL, i.e., UE to eNB) physical channels provided by the LTE PHY include Physical Uplink Shared Channel (PUSCH), Physical Uplink Control Channel (PUCCH), and Physical Random Access Channel (PRACH). PUSCH is the uplink counterpart to the PDSCH. PUCCH is used by UEs to transmit uplink control information, including HARQ acknowledgements, channel state information reports, etc. PRACH is used for random access preamble transmission.

3GPP is currently specifying fifth-generation (5G) networks, including radio access technologies often referred to as NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

For both LTE and NR, a UE can perform a random-access procedure in any of the following circumstances, events, and/or conditions:
  Initial access from RRC_IDLE state;
  During an RRC connection re-establishment procedure;
  During handover (i.e., change in serving cell while in RRC_CONNECTED state);
  Upon arrival of DL data while in RRC_CONNECTED state (when UE is not synchronized with the network); and
  Upon arrival of UL data while in RRC_CONNECTED state (as needed, e.g., when the UE's UL is non-synchronized with the network and/or there are no PUCCH resources available for transmitting a scheduling request, SR).

Conventionally, UE random-access has been contention-based, such that the UE's random-access transmissions (also referred to as "preambles," "sequences," or "msg1") can collide with random-access transmissions from other UEs attempting to access the same cell in the same RACH slot. In such case, the network may not correctly receive the UE's random-access preamble transmissions, causing the UE to attempt retransmission at a higher power level. This can introduce delay and extra UE energy consumption, as well as additional interference in the RACH slot.

To address these problems, certain abbreviated random-access procedures have been proposed, whereby the UE can transmit a random-access preamble on RACH together with a small amount of higher-layer data on PUSCH. Even so, there are various unresolved problems and/or issues related to the mapping and/or relationships between random-access preambles and PUSCH resources used by UEs in such abbreviated random-access procedures.

SUMMARY

Embodiments of the present disclosure provide specific improvements to communication between user equipment (UE) and network nodes in a wireless network, such as by facilitating solutions to overcome exemplary random-access problems summarized above and described in more detail below.

Some embodiments of the present disclosure include methods (e.g., procedures) for user equipment (UE) random access to a cell in a wireless network. These exemplary methods can be performed by a UE (e.g., wireless device, MTC device, NB-IoT device, etc. or component thereof) operating in the wireless network (e.g., E-UTRAN, NG-RAN, or any radio access network supporting a random access procedure similar to the random access procedure specified in 3GPP for NR).

These exemplary methods can include selecting one of a plurality of available random-access preambles and mapping the selected random-access preamble to one of a plurality of available physical uplink shared channel (PUSCH) resource units (PRUs) based on a mapping constraint. The mapping constraint includes that one or more of the available PRUs are not used for the mapping, and that an integer number of the available random-access preambles are mapped to each of the available PRUs that are used for the mapping. These exemplary methods can also include transmitting the selected random-access preamble on a random access channel (RACH) and transmitting a data message on the PRU mapped to the selected random-access preamble.

In some embodiments, the available random-access preambles can be arranged into a plurality of first groups and the available PRUs can be arranged into a plurality of second groups. In such embodiments, the mapping constraint can include a one-to-one mapping between the first groups and the second groups (e.g., respective first groups mapped to respective second groups). In some of these embodiments, the selecting operations can include selecting one of the first groups based on UE measurement of downlink signal quality and randomly selecting a random-access preamble from the selected first group.

In some embodiments, the mapping constraint can be associated with a mapping period. During the mapping period, the available PRUs that are not used for the mapping occur after the available PRUs that are used for the mapping (e.g., at the end of the mapping period).

In some embodiments, at least one of the following depends on whether frequency hopping is enabled for the PUSCH: a number of the available PRUs that are not used for the mapping; and the integer number of the available random-access preambles mapped to each of the available PRUs that are used for the mapping. In this manner, different mapping ratios can be employed depending on whether frequency hopping is enabled on the PUSCH.

In some embodiments, the data message can be transmitted on the PRU associated with the selected random-access preamble using one or more of the following: a lower transmit power level relative to transmit power levels for other available PRUs; a UE-specific spatial filter; and a UE-specific scrambling code. In some embodiments, the data message can be transmitted on the PRU associated with the selected random-access preamble without receiving a response, from the wireless network, to the transmission of the selected random-access preamble. In this manner, the UE can perform a two-step random access procedure.

Other embodiments of the present disclosure include methods (e.g., procedures) for facilitating user equipment (UE) random-access to a cell in a wireless network. These exemplary methods can be performed by a network node (e.g., base station, eNB, gNB, ng-eNB, etc. or component thereof) serving the cell in a wireless network (e.g., E-UTRAN, NG-RAN, etc.).

These exemplary methods can include detecting a random-access preamble transmitted by a UE on a random access channel (RACH) in the cell and mapping the detected random-access preamble to one of a plurality of available physical uplink shared channel (PUSCH) resource units (PRUs) based on a mapping constraint. The mapping constraint includes that one or more of the available PRUs are not used for the mapping, and that an integer number of the available random-access preambles are mapped to each of the available PRUs that are used for the mapping. These exemplary methods can also include receiving a data message transmitted by the UE on the PRU mapped to the detected random-access preamble.

In some embodiments, the available random-access preambles can be arranged into a plurality of first groups and the available PRUs can be arranged into a plurality of second groups. In such embodiments, the mapping constraint can include a one-to-one mapping between the first groups and the second groups (e.g., respective first groups mapped to respective second groups). In some of these embodiments, the detected random-access preamble is from a particular one of the first groups that is associated with a particular downlink signal quality measured by the UE.

In some embodiments, the mapping constraint can be associated with a mapping period. During the mapping period, the available PRUs that are not used for the mapping occur after the available PRUs that are used for the mapping (e.g., at the end of the mapping period).

In some embodiments, at least one of the following depends on whether frequency hopping is enabled for the PUSCH: a number of the available PRUs that are not used for the mapping; and the integer number of the available random-access preambles mapped to each of the available PRUs that are used for the mapping. In this manner, different mapping ratios can be employed depending on whether frequency hopping is enabled on the PUSCH.

In some embodiments, the data message can be received on the PRU associated with the detected random-access preamble using one or more of the following: a lower power level relative to power levels for other available PRUs; a UE-specific spatial filter; and a UE-specific scrambling code. In some embodiments, the data message can be received on the PRU associated with the detected random-access preamble without transmitting, to the UE, a response to the detected random-access preamble. In this manner, the network node can facilitate the UE's two-step random access procedure rather than a conventional four-step random access procedure.

Other embodiments include UEs (e.g., wireless devices, MTC devices, NB-IoT devices, etc. or components thereof) and network nodes (e.g., base stations, eNBs, gNBs, ng-eNBs, etc. or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other objects, features, benefits, and advantages of embodiments of the present disclosure will become apparent upon reading the following Detailed Description in view of the Drawings briefly described below.

DETAILED DESCRIPTION

Figure 1:
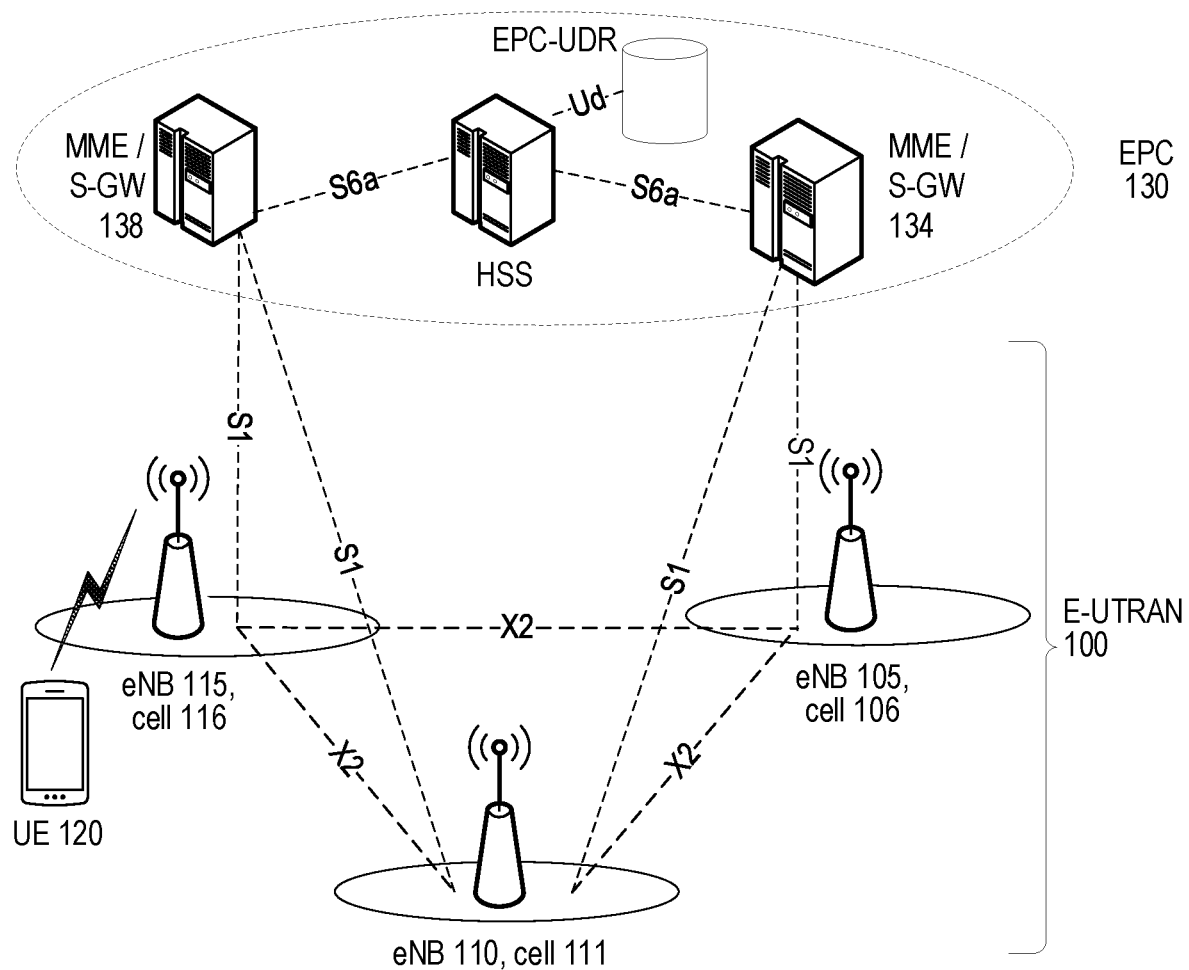
FIG. 1 is a high-level illustration of an exemplary architecture of the Long-Term Evolution (LTE) Evolved UTRAN (E-UTRAN) and Evolved Packet Core (EPC) network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, certain abbreviated random-access procedures have been proposed, whereby the UE can transmit a small amount of higher-layer data together with a random-access preamble. From the UE's and network's perspectives, this higher-layer data can be considered a PUSCH transmission, such as discussed above. Even so, there are various unresolved problems and/or issues related to the mapping and/or relationships between random-access preambles and PUSCH resources used by a UE in such abbreviated random-access procedures. These are discussed in more detail below.

Figure 2:
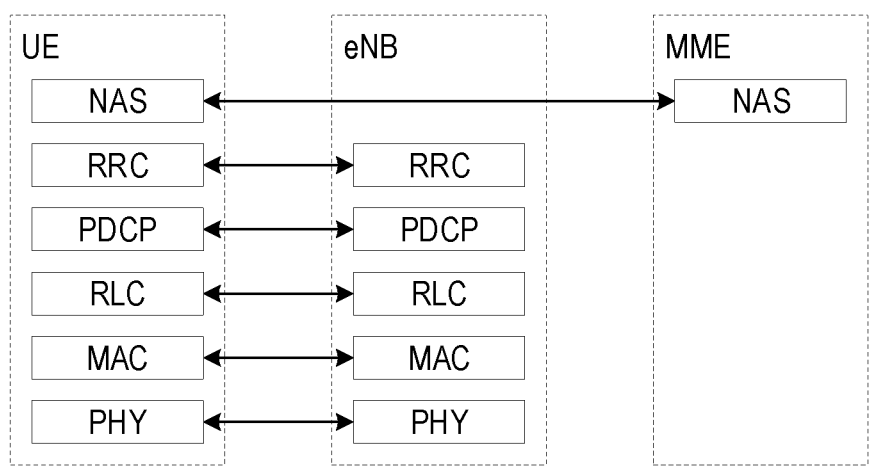
FIG. 2 is a high-level illustration of exemplary protocol layers of the control-plane portion of the radio interface between a user equipment (UE) and the E-UTRAN.
Figure 3:
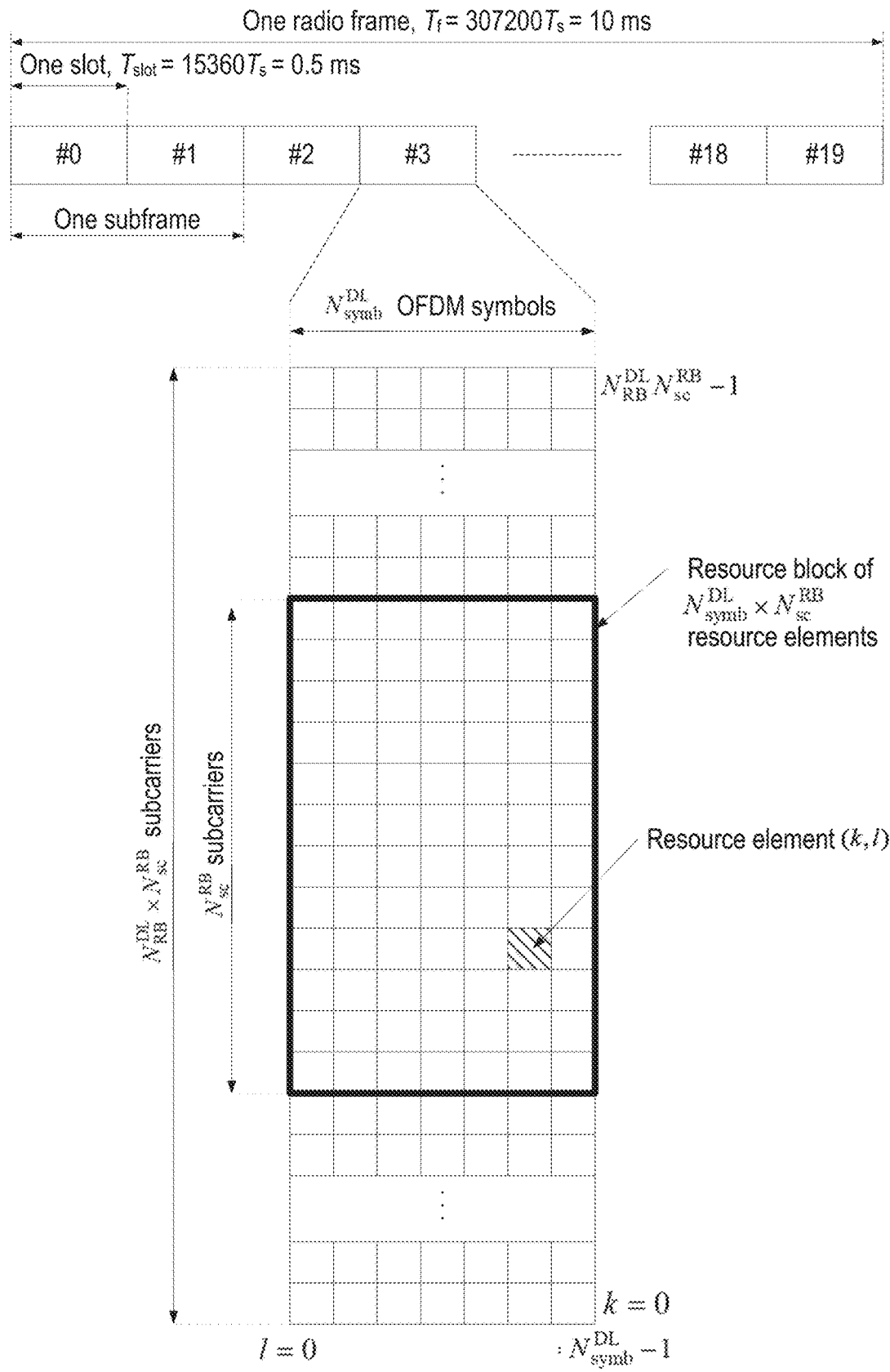
FIG. 3 is a block diagram of an exemplary downlink LTE radio frame structure used for frequency division duplexing (FDD) operation.

As discussed above, the LTE RRC layer (shown in FIG. 2) controls communications between a UE and an eNB at the radio interface, as well as the mobility of a UE between cells in the E-UTRAN. Prior to Rel-13, only RRC_IDLE and RRC_CONNECTED states were defined for a UE. In LTE Rel-13, a mechanism was introduced for the UE to be suspended by the network in a suspended state similar to RRC_IDLE but with some important differences. First, the suspended state is not a third RRC "state" alongside RRC_IDLE and RRC_CONNECTED; rather it can be viewed as a "sub-state" of RRC_IDLE.

Second, both the UE and the serving eNB store the UE's AS (e.g., S1-AP) context and RRC context after suspension. Later when the suspended UE needs to resume a connection (e.g., to send UL data), instead of going through the conventional service request procedure, the suspended UE merely sends an RRCConnectionResumeRequest message to the eNB. The eNB resumes the S1AP context and responds with a RRCConnectionResume message. There is no elaborate exchange of security context between MME and eNB and no setup of AS security context. The preserved AS and RRC contexts are merely resumed from where they were suspended earlier. Reducing the signaling can provide reduced UE latency (e.g., for accessing Internet) and reduced UE energy consumption, particularly for machine type communication (MTC) devices that send very little data (i.e., signaling is a primary energy consumer).

While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

The NR and LTE physical layers have many similarities. NR uses CP-OFDM (Cyclic Prefix Orthogonal Frequency Division Multiplexing) in the DL and both CP-OFDM and DFT-spread OFDM (DFT-S-OFDM) in the UL. In the time domain, NR DL and DL physical resources are organized into equally-sized subframes of 1 ms each. A subframe is further divided into multiple slots of equal duration, with each slot including multiple OFDM-based symbols. In addition, the NR UL and DL physical channels are similar to those used in LTE, discussed above.

The NR RRC layer includes RRC_IDLE and RRC_CONNECTED states like in LTE but adds an RRC_INACTIVE state with similar properties as the suspended sub-state in LTE Rel-13. However, the RRC_INACTIVE state is a separate RRC state and not part of RRC_IDLE as in LTE. Additionally, the CN/RAN connection (NG or N2 interface) is kept alive during RRC_INACTIVE while it is suspended in LTE.

In addition to providing coverage via cells, as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Figure 4:
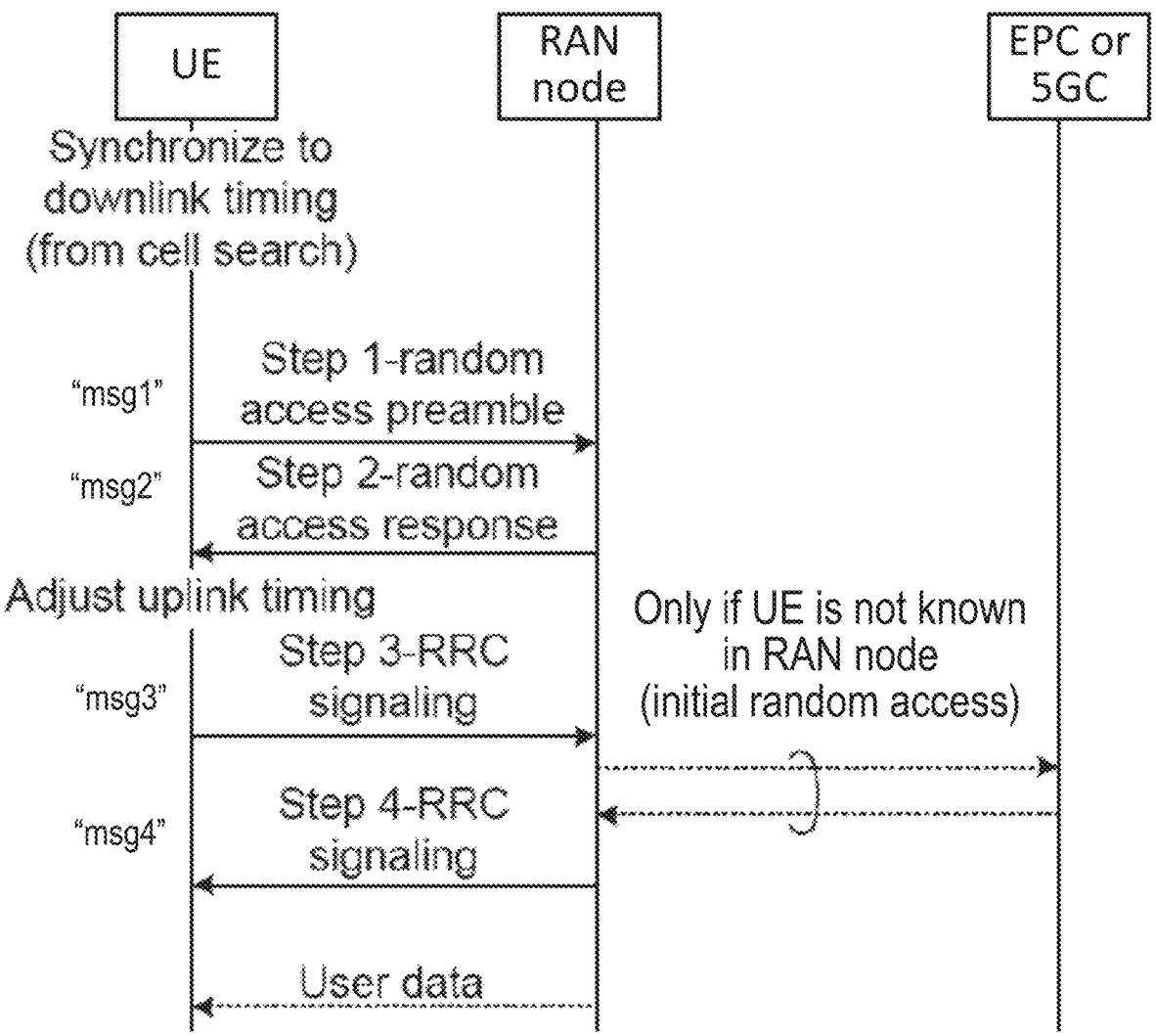
FIG. 4 illustrates an exemplary four-step contention-based random-access (CBRA) procedure.

As briefly mentioned above, UEs conventionally access a serving cell using a contention-based random-access procedure (CBRA). FIG. 4 illustrates the steps (i.e., operations) in an exemplary CBRA procedure. In step 1, the UE randomly selects one random-access preamble (or sequence) from a known set of preambles indicated by the network (i.e., the serving RAN node, such as eNB or gNB) via broadcast system information (SI). The purpose of random preamble selection is to avoid collisions by separating the preambles in a code domain. In LTE there are typically 64 different available preambles in each cell, which in turn are divided into multiple groups. The grouping allows the UE to signal with one bit whether it needs radio resources for a small or large message (data package). That is, a randomly selected preamble from one group can indicate that the UE has a small amount of data to send, while a preamble selected from another group indicates that resources for a larger amount of data are needed.

The UE transmits the RA preamble (also referred to as "msg1") only on certain UL time/frequency resources, which are also made known to all UEs via the broadcast SI. The eNB detects all non-colliding preambles transmitted by UEs in these resources and estimates the roundtrip time (RTT) for each UE. The RTT is needed to achieve time and frequency synchronization in both DL and UL for the UE in the LTE or NR OFDM-based systems.

In step 2, the RA response (RAR, also referred to as "msg2")) from the RAN node carries the RTT, a temporary UE identity (e.g., C-RNTI), and UL resources for the UE to use in step 3. As mentioned above, the UE can use the received RTT to adjust its transmission window in order to obtain UL synchronization. The RAR is scheduled on a DL shared channel (e.g., PDSCH) and is indicated on a DL control channel (e.g., PDCCH) using an identity reserved for RARs. All UEs that transmitted a RA preamble monitor PDCCH for RAR within a time window after their preamble transmissions. If the UE does not detect a RAR within the time window, it declares a failed attempt and repeats step 1 using an increased transmission power level for the preamble (or msg1). Note that the RAN node will detect the presence of a particular preamble but not how many UEs concurrently transmitted that particular preamble.

The received UL resource assignment to be used in step 3 is essentially a pointer (e.g., to a location on the UL time/frequency resource grid) that informs the UE exactly which subframes (time) to transmit in and what resource blocks (frequency) to use. The higher layers indicate the 20-bit UL Grant to the PHY, as defined in 3GPP TS 36.321 and 36.213. In the LTE PHY, this is referred to the RAR Grant and is carried on the PDCCH by a specific format of downlink control information (DCI). The RAR Grant size is intended to balance between minimizing number of bits to convey the resource assignment while providing some resource assignment flexibility for the eNB scheduler. In general, the length of the PHY message depends on the system bandwidth.

In step 3, upon correct reception of the RAR in step 2, the UE is time synchronized with the eNB. Before any transmission can take place, a unique identity C-RNTI is assigned. The UE transmission in this step (referred to as "msg3") uses the UL channel radio resources assigned in step 2. Additional message exchange might also be needed depending on the UE state, as indicated in FIG. 4 by the arrows drawn with dashed lines. In particular, if the UE is not known in the eNB, then some signaling is needed between the eNB and the core network.

In step 4, the eNB sends msg4 via RRC signal to possibly solve contention. If the UE has used the allocated C-RNTI in msg3, this C-RNTI is echoed back in MSG.4 to indicate that collision is resolved. Otherwise, the network addresses the UE with the TC-RNTI and includes in the MAC payload the UE identity used in msg3. If the UE identity matches the one the UE has the UE considers the contention resolved. In case a collision is detected, the UE performs preamble re-transmission and initiates random access again. Collision is considered to be detected in the following cases:

After transmitting msg3 using a C-RNTI assigned by target cell (e.g. in handover or when UE is in RRC_CONNECTED), UE detects a msg4 not addressing its C-RNTI and contention resolution timer expires;

After transmitting a msg3 using a TC-RNTI assigned to it in the RAR, UE detects a msg4 addressing the same TC-RNTI but the UE Identity in the msg4 payload does not match the UE's identity transmitted on msg3.

Note that collision is not considered in MAC as a failure case. As such, upper layers are not aware that a collision has occurred.

In addition to the cases mentioned above, preamble retransmission is also triggered when the UE sends a preamble and does not receive a RAR within a RAR time window. In that case, the UE performs preamble power ramping and transmits the preamble again. In all these cases, when RAR time window expires when collision is detected, the UE performs preamble retransmission. A parameter provided by the RAN node via RRC signaling controls how many times the UE should attempt preamble retransmission.

Figure 5:
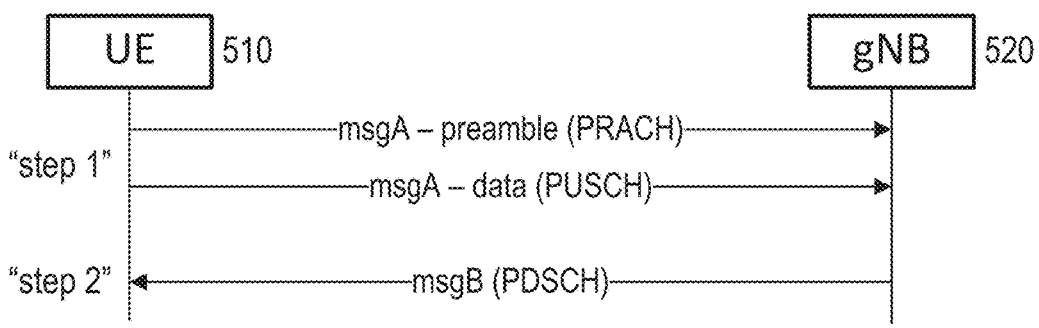
FIG. 5 illustrates an exemplary two-step CBRA procedure.

In any event, the preamble retransmission can increase latency for the UE in accessing the cell. To reduce this latency, however, a two-step random-access procedure has been proposed as an alternative to the four-step CBRA illustrated in FIG. 4. In particular, FIG. 5 illustrates an exemplary two-step random-access procedure proposed for NR.

In step 1, instead of "msg1" such as shown in FIG. 4, the UE (510) transmits a message referred to as "msgA" to the gNB (520) serving the cell. This message includes two parts: 1) a preamble transmitted on PRACH, similar to msg1; and 2) a higher layer data part (e.g., an RRC connection request with some small additional payload) transmitted on PUSCH.

The gNB's response to the UE's msgA depends on success or failure of both RACH detection and PUSCH message decoding. If both are successful, the response shown in step 2 of FIG. 5 is msg-B, which includes UE identifier (e.g., C-RNTI) assignment, TA information, contention resolution message, etc. Although not shown in FIG. 5, several techniques are available in the event of unsuccessful RACH detection and/or PUCCH message decoding, including fallback to conventional four-step random-access procedure, reserving separate PRACH and PUSCH resources for two-step and four-step procedures, etc.

Figure 6:
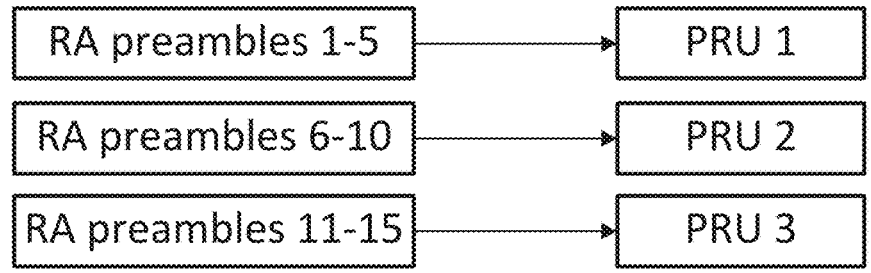
FIG. 6 shows an exemplary mapping between 16 random-access (or RACH) preambles and three PUSCH resource units (PRUs) utilized in an exemplary two-step CBRA procedure.

The PUSCH payload in msg-A is transmitted over a set of time-frequency resources referred to as a PUSCH Occasion (PO), and the random-access preamble is transmitted over a set of time-frequency resources known as a RACH Occasion (RO). Each PO is associated with a DM-RS sequence, a DM-RS port (including OCC and cyclic shift), and (optionally) a scrambling ID, the combination of which is referred to as a PUSCH Resource Unit (PRU). PO time-frequency resources may be contiguous or there may be a gap between the occupied time-frequency resources in either domain. For msg-A PUSCH transmission, the PRUs may be reserved or may be allocated based on dynamic grant. Each PRU is also mapped to a set of random-access preambles (also referred to as random-access sequences, RACH sequences, or RACH preambles). FIG. 6 shows an exemplary mapping between 16 random-access preamble and three PRUs.

The following agreements have been reached in 3GPP RAN1 working group (WG) in relation to the mapping order between preamble to PRU, including mapping ratio determination:
The ordering of the msgA random-access preambles within an msgA association period is:
First, in increasing order of preamble indexes within a single PRACH occasion;
Second, in increasing order of frequency resource indexes for frequency multiplexed PRACH occasions;
Third, in increasing order of time resource indexes for time multiplexed PRACH occasions within a PRACH slot; and
Fourth, in increasing order of indexes for PRACH slots.
Random-access preambles are mapped to valid PUSCH resource units (PRUs) within an msgA association period in the following order:
First, in increasing order of frequency resource indexes for frequency multiplexed PUSCH occasions;
Second, in increasing order of DMRS indexes within a single PUSCH occasion
For further study (FFS) DMRS indexes for DMRS ports and/or sequences;
Third, in increasing order of time resource indexes for time multiplexed PUSCH occasions within a PUSCH slot; and
Fourth, in increasing order of indexes for PUSCH slots,
For multiple configurations, the mapping is between the PRUs under each msgA PUSCH configuration and the preambles in the corresponding preamble group
Each msgA PUSCH configurations can identify subsets of DMRS port/sequence combination
Preamble-to-PRU mapping ratio is down-selected from:
Alt 1: A single value per configuration, which is implicitly derived by the total numbers of valid preambles and valid PRUs in the SSB-to-RO association pattern period; or
Alt 2: A single value per SSB-to-RO association period, which is implicitly derived by the total numbers of valid preambles and valid PRUs in the SSB-to-RO association period.
It is For Further Study (FFS) how to handle the fractional part of mapping ratio, if any.
It is FFS how to make sure a valid PRU occurs after its corresponding preamble.

Even so, there are various problems and/or issues with these agreed-upon mapping relationships between random-access preambles and PRUs for msgA. Let N=(number of preambles available)/(number of PRUs available) be the average number of random-access preambles mapped to each PRU (also referred to as the "mapping ratio"). For N>1, N should be an integer such that the same number of random-access preambles are mapped to each PRU such that the many-to-one mapping is balanced. Since the random-access preamble (and hence the associated PRU) is selected randomly by the UE, such an arrangement will produce the same PUSCH collision probability for every random-access preamble so that no PRUs are favored or disadvantaged.

In contrast, if the RACH selection probability is equal for the mapping shown in FIG. 6, then the PUSCH collision probability on PRU3 is slightly higher than for PRU1 and PRU2, since PRU3 is associated with one more random-access preamble. As such, PRU3 can be referred to as an "overloaded PRU." Furthermore, if a retransmission of msgA (i.e., for a failed reception) occurs on the same PRU, then the probability of PUSCH collision may not improve even with a power increase by the UE.

Random-access preambles can be grouped into CBRA sequences and contention-free random access (CFRA) sequences. Even so, the present disclosure focuses on a CBRA arrangement in which msg-A PUSCH contents may collide with msg-A PUSCH contents from other UEs.

Accordingly, optimizing the mapping between a given set of available random-access preambles and a given set of PRUs can be important for network and UE random-access performance. A balanced setup in which PUSCH collision probability is equal for all available random-access preambles may be desirable and/or necessary. Unless there is orthogonality among all the PUSCH resources used for msgA, there is a high probability of PUSCH decoding failure due to multiuser interference (MUI) on overlapping, non-orthogonal, and/or shared PUSCH resources. In fact, resource orthogonality may not be possible, particularly if the number of UEs is much larger than the number of PRUs.

Figure 7:
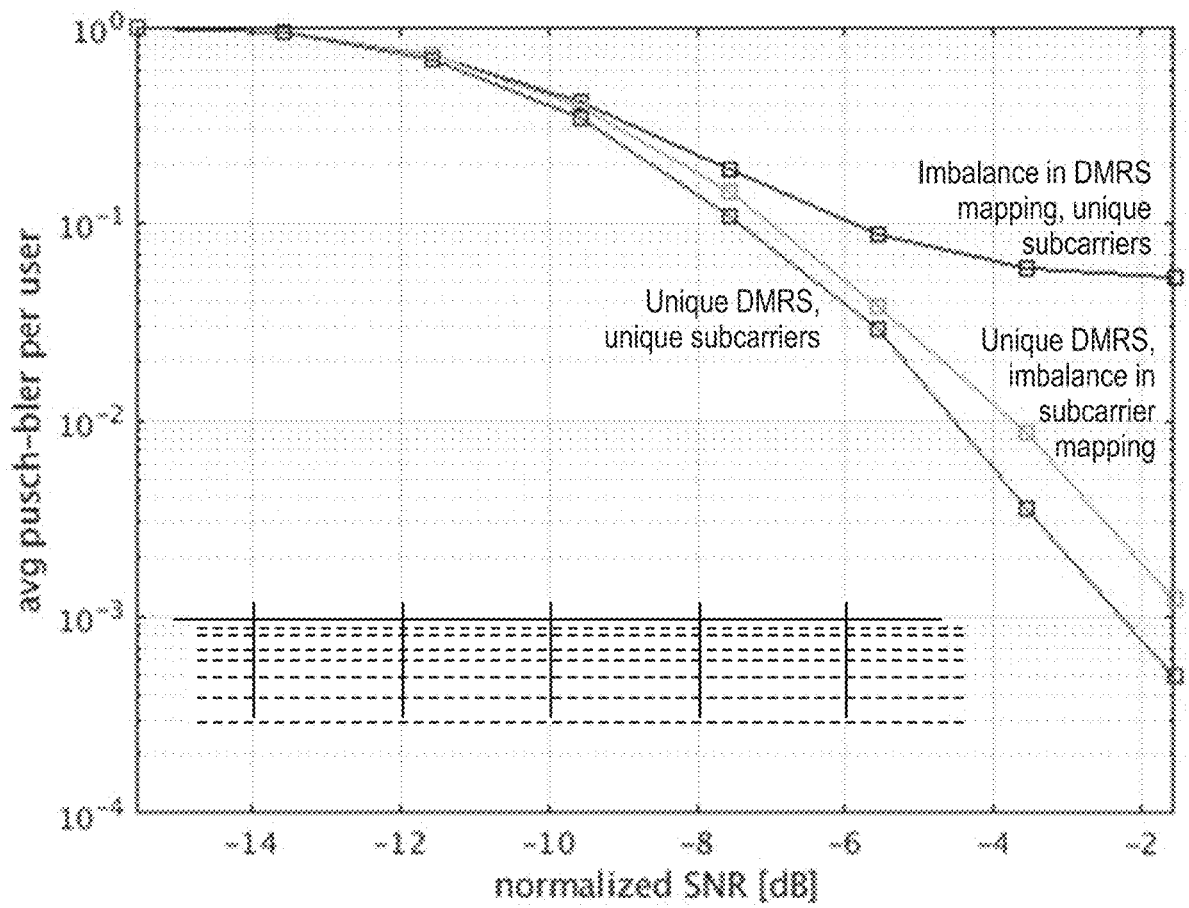
FIG. 7 is a graph that illustrates the effect of non-integer (or skewed) mapping between random-access preambles and PRUs on block error rate (BLER) performance for PUSCH transmissions.

FIG. 7 shows a graph that illustrates the effect of non-integer (or skewed) mapping on block error rate (BLER) performance for PUSCH transmissions. The example shown in FIG. 7 is based on four UEs, 16 random-access preambles, four DMRS ports, 12 PRBs, and four PUSCH Occasions (POs). As such, there are three PRBs per PO. FIG. 7 shows PUSCH block error rate (BLER) performance for three different cases, with SNR (horizontal axis) normalized such that the average energy per OFDM symbol is unity.

A first case is an orthogonal arrangement in which each UE selects a unique PO and a unique DMRS port. This case, which is a baseline shown as the lowest of the three curves, assumes that the mapping is fixed and independent of the random-access preamble selection. One possible balanced setup may be obtained by having four random-access preambles per DMRS port and four random-access preambles per PO.

An imbalance in the random-access preamble-to-PRU mapping may be obtained by skewing the random-access preamble-to-DMRS port mapping and/or the random-access preamble-to-PO mapping. These two cases are shown in the upper two curves in FIG. 7. As can be seen, the BLER performance degrades if the mapping is skewed. Furthermore, in this example, the degradation with overloaded DMRS ports (upper curve) is more severe than with overloaded POs (middle curve).

Accordingly, exemplary embodiments of the present disclosure provide novel, flexible, and efficient techniques for determining and/or defining RACH Occasions (ROs) and msgA PRUs so that a mapping ratio can be derived to eliminate, reduce, and/or balance collisions between UEs. Some embodiments also provide techniques for handling imbalances between ROs and PRUs such that an integer mapping ratio can be obtained (i.e., the same number of random-access preambles are mapped to each PRU).

When collision of PRUs is unavoidable, such embodiments can reduce collision probability in an asynchronous network where there is no feedback to aid the UE's selection of random-access preambles and PRUs. Further, a balanced mapping arrangement can be obtained by associating all PRUs with an equal (integer) number of random-access preambles. In practical terms, such improvements can yield reduced latency and UE energy consumption for random-access attempts via a two-step procedure, as well as reduced interference in RACH and/or PUSCH resources.

Certain embodiments include techniques for determining the preamble/RO definition and the msgA PO/PRU definition so that a mapping ratio can be derived adaptively. Other embodiments include techniques for handling imbalanced resources between RO and PO such that an integer mapping ratio can be obtained. These various embodiments are discussed in more detail below.

In some embodiments, one or more of the following rules can be utilized (e.g., by the network or UE) to ensure an adequate, correct, acceptable, and/or proper mapping ratio. For example, after the POs to be occupied are selected, some of the remaining POs in the end of the mapping period are invalidated such that they are not used for mapping. As a more specific example, with eight PRUs and 10 preambles, N=(10 preambles)/(8 PRUs)=1.25 preambles/PRU, an undesirable non-integer value. If the last two random-access preambles during the mapping period are not used for mapping, then N=(8 preambles)/(8 PRUs)=1 preamble/PRU, a desirable integer value that provides a balanced arrangement. However, invalidating these last two random-access preambles may increase the collision probability for the remaining eight, since more UEs will be using each random-access preamble.

In the same manner, certain PRUs can be invalidated such that they are not used for mapping, resulting in a desirable integer mapping ratio. For example, with eight PRUs and 12 preambles, the last two PRUs during the mapping period are not used resulting in an integer mapping ratio of N=(12 preambles)/(6 PRUs)=2 preambles/PRU. However, eliminating the last two PRUs may increase the collision probability for the remaining six, since more UEs will be using each PRU.

Disabling, invalidating, and/or not using certain random-access preambles and/or certain PRUs to achieve a desired mapping ratio can be done in various ways. In some embodiments, it can be done at the discretion of the UE. In other embodiments, it can be enabled, disabled, and/or configured by the network, e.g., via broadcast SI and/or via UE-specific RRC signaling. In some embodiments, if the mapping ratio is non-integer such that certain PRUs are overloaded, a scheduling strategy on the overloaded PRUs can be configured by the network to the UEs, e.g., via broadcast SI and/or UE-specific RRC signaling. In other embodiments, such a scheduling strategy can be pre-configured, such as by inclusion in a relevant 3GPP specification.

In some embodiments, the available random-access preambles can be grouped such that different groups can have different collision probabilities. For example, some of the imbalanced random-access preambles allocated to a separate group. As a more specific example, available random-access preambles can be grouped into two groups, one for CBRA and the other for CFRA. Any imbalanced random-access preambles can be placed into the CFRA group when the CBRA preambles are allocated. Considering 18 random-access preambles and eight PRUs, two random-access preambles may be reserved for CFRA while 16 are allocated for the CBRA to produce a desirable N=2 integer mapping ratio between random-access preambles and PRUs.

In another example, the imbalanced random access preambles may be allocated by the network for the legacy four-step random access procedure rather than the two-step random access procedure, in case the two procedures share ROs. In this example, one group of preambles can be for four-step random access procedure, another group for two-step random access procedure.

In another example, a set of random-access preamble groups can be defined, with one of the groups associated with imbalanced PRUs. UE selection of the random-access preambles of this group (and the associated PO) may be determined based on one or more of the following:

If a measurement of a RS (e.g., RSRP, RSRQ) is greater than a given threshold;

PUSCH payload size and/or priority;

Whether frequency hopping of msgA PUSCH is enabled; and/or

UE RRC state—To reduce collision probability for a UE in RRC_CONNECTED state, a preamble/PRU group can be signaled to UE based on the number of msgA preambles/PUSCHs in each group detected by the network. For UEs in RRC_INACTIVE and RRC_CONNECTED states, C-RNTI is already available and can be used by the UE to scramble msg-B.

In some embodiments, to reduce collision probability, POs (or PRUs) can be grouped (e.g., based on a PUSCH configuration) with a group reserved for specific events. As an example, groups A and B can be defined, with group A having a higher collision probability and group B having a lower collision probability. Group B POs can be reserved for selection by UEs experiencing poor signal quality (e.g., worse than some threshold value as determined by UE measurement of a DL RS).

In some embodiments, the number of PRBs/subcarriers within a PO can be modified and/or adapted as needed to reduce collision probability. For example, a UE may utilize only a subset of subcarriers within the available number of subcarriers. The unused subcarriers may be used as guard band.

In some embodiments, various UE processing techniques can be employed for reducing the collision probability for msgA PUSCH transmissions. These include any of the following:

UE baseband PUSCH preprocessing, e.g., spatial separation of high priority msgA PUSCH by UE-specific spatial filters, UE-specific scrambling codes (bit and/or symbol level), etc.

Lower UE transmit power levels on overloaded PRUs, possibly including no power ramping and/or no retransmissions on such PRUs.

Frequency hopping—The relative ratio between the number of msgA preamble resources and the msgA PUSCH resources can be determined based on whether frequency hopping is enabled for msgA PUSCH. For example, when FH is enabled, a lower mapping ratio can be configured to reduce the interference between hops from different POs on the same PRBs but different timing.

As discussed above, in various embodiments, a set of random-access preamble groups and/or a set of PRU groups can be defined. When the number of random-access preamble groups is different from the number of PRU groups (i.e., they are imbalanced), one random-access preamble group can be mapped to multiple PRU groups (i.e., a many-to-one mapping). In such case, if the network detects a random-access preamble from that random-access preamble group, it will need to decode multiple different PRUs. Accordingly, various embodiments addressing issues resulting from imbalances between random-access preamble groups and PRU groups are discussed below.

In some embodiments, a one-to-one mapping is required between random-access preamble groups and PRU groups (i.e., the number of random-access preamble groups is the same as the number of PRU groups). In some of these embodiments, a group ID can be introduced to do the mapping between random-access preamble groups and PRU groups. In other of these embodiments, certain random-access preamble groups can be restricted to be used by UEs in certain RRC states, such that there is a one-to-one mapping between mapping between random-access preamble groups and PRU groups for UEs in those RRC states.

As an example of these embodiments, four random-access preamble groups can be defined, with two restricted to UEs in RRC_IDLE and RRC_INACTIVE states and the other two restricted to UEs in RRC_CONNECTED state. If only two PRU groups are defined and are usable in all RRC states, then there can be a one-to-one mapping between random-access preamble groups and PRU groups for UEs in RRC_IDLE and RRC_INACTIVE states, and a one-to-one mapping between random-access preamble groups and PRU groups for UEs in RRC_CONNECTED state. Alternately, if four PRU groups are defined, then two can be restricted to RRC_IDLE and RRC_INACTIVE states to provide a one-to-one mapping for UEs in RRC_IDLE and RRC_INAC-TIVE states. Likewise, the other two PRU groups can be restricted to RRC_CONNECTED state to provide a one-to-one mapping between random-access preamble groups and PRU groups for UEs in RRC_CONNECTED state.

In other embodiments, the mapping between random-access preamble groups and PRU groups can be one-to-one, many-to-one, or one-to-many. For example, if the mapping is one-to-many, the UE can pick one of the various PRU groups mapped to a particular random-access preamble group based on the UE's RRC state, and the network can blindly decode PUSCH in the various PRU groups according to the UE's known RRC state.

As another example, if the mapping is many-to-one, the UE can select one of the random-access preamble groups based on the UE's RRC state (or any other property that distinguishes the respective groups, such as DL signal quality), and select a random-access preamble within the selected group (e.g., randomly). The network can determine the PRU group carrying the PUSCH message based on the mapping of the detected random-access preamble.

Figure 8:
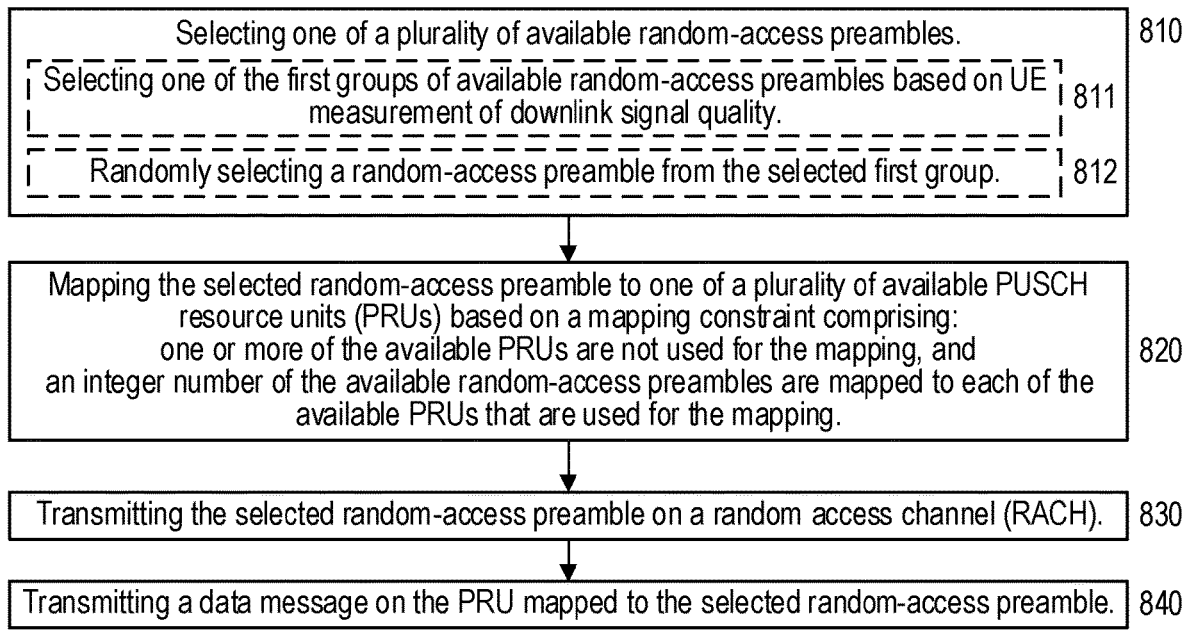
FIG. 8 shows a flow diagram of an exemplary method (e.g., procedure) for a user equipment (UE, e.g., wireless device, IoT device, etc. or component thereof), according to various exemplary embodiments of the present disclosure.
Figure 9:
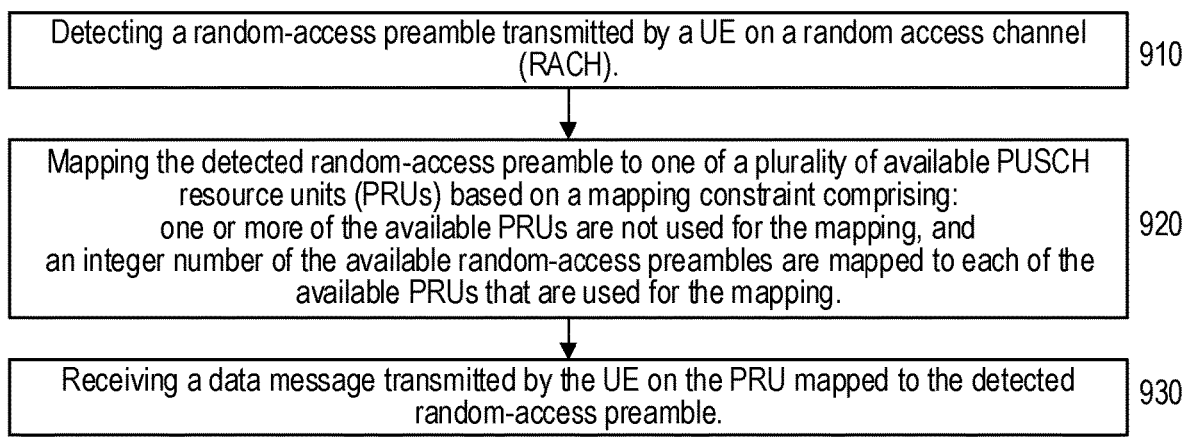
FIG. 9 shows a flow diagram of an exemplary method (e.g., procedure) for a network node (e.g., base station, eNB, gNB, ng-eNB, etc. or component thereof), according to various exemplary embodiments of the present disclosure.

The embodiments described above can be further illustrated with reference to FIGS. 8-9, which depict exemplary methods (e.g., procedures) for a UE and a network node, respectively. Put differently, various features of the operations described below correspond to various embodiments described above. Furthermore, the exemplary methods shown in FIGS. 8-9 can be used cooperatively to provide various exemplary benefits and/or advantages, including those described herein. Although FIGS. 8-9 show specific blocks in particular orders, the operations of the exemplary methods can be performed in different orders than shown and can be combined and/or divided into blocks having different functionality than shown. Optional blocks or operations are indicated by dashed lines.

In particular, FIG. 8 shows a flow diagram of an exemplary method (e.g., procedure) for user equipment (UE) random access to a cell in a wireless network, according to various exemplary embodiments of the present disclosure. The exemplary method shown in FIG. 8 can be performed by a UE (e.g., wireless device, MTC device, NB-IoT device, etc. or component thereof) operating in the wireless network (e.g., E-UTRAN, NG-RAN, etc.), such as UEs described elsewhere herein.

The exemplary method can include the operations of block 810, in which the UE can select one of a plurality of available random-access preambles. The exemplary method can include the operations of block 820, in which the UE can map the selected random-access preamble to one of a plurality of available physical uplink shared channel (PUSCH) resource units (PRUs) based on a mapping constraint. The mapping constraint includes that one or more of the available PRUs are not used for the mapping, and that an integer number of the available random-access preambles are mapped to each of the available PRUs that are used for the mapping. Various examples of such mapping constraints were discussed above.

The exemplary method can also include the operations of block 830, in which the UE can transmit the selected random-access preamble on a random access channel (RACH). The exemplary method can also include the operations of block 840, in which the UE can transmit a data message on the PRU mapped to the selected random-access preamble.

In some embodiments, the available random-access preambles can be arranged into a plurality of first groups and the available PRUs can be arranged into a plurality of second groups. In such embodiments, the mapping constraint can include a one-to-one mapping between the first groups and the second groups (e.g., respective first groups mapped to respective second groups). In some of these embodiments, the selecting operations of block 810 can include the operations of sub-blocks 811-812. In sub-block 811, the UE can select one of the first groups based on UE measurement of downlink signal quality (e.g., for DL RS). In sub-block 812, the UE can randomly select a random-access preamble from the selected first group.

In some embodiments, the mapping constraint can be associated with a mapping period. For example, the mapping period can be a msgA association period or a msgA association pattern period. Furthermore, during the mapping period, the available PRUs that are not used for the mapping occur after the available PRUs that are used for the mapping (e.g., at the end of the mapping period, as discussed above).

In some embodiments, at least one of the following depends on whether frequency hopping is enabled for the PUSCH: a number of the available PRUs that are not used for the mapping; and the integer number of the available random-access preambles mapped to each of the available PRUs that are used for the mapping. In this manner, different mapping ratios can be employed depending on whether frequency hopping is enabled on the PUSCH.

In some embodiments, the data message can be transmitted (e.g., in block 840) on the PRU associated with the selected random-access preamble using one or more of the following: a lower transmit power level relative to transmit power levels for other available PRUs; a UE-specific spatial filter; and a UE-specific scrambling code.

In some embodiments, the data message can be transmitted (e.g., in block 840) on the PRU associated with the selected random-access preamble without receiving a response, from the wireless network, to the transmission of the selected random-access preamble. In this manner, the UE can perform the two-step random access procedure rather than the conventional four-step random access procedure.

In addition, FIG. 9 shows a flow diagram of an exemplary method (e.g., procedure) for facilitating user equipment (UE) random-access to a cell in a wireless network, according to various exemplary embodiments of the present disclosure. The exemplary method shown in FIG. 9 can be performed by a network node (e.g., base station, eNB, gNB, etc. or component thereof) serving the cell in a wireless network (e.g., E-UTRAN, NG-RAN, etc. or any radio access network supporting a random access procedure similar to the two-step procedure specified in 3GPP for NR), such as network nodes described elsewhere herein.

The exemplary method can also include the operations of block 910, in which the network node can detect a random-access preamble transmitted by a UE on a random access channel (RACH) in the cell. The exemplary method can also include the operations of block 920, in which the network node can map the detected random-access preamble to one of a plurality of available physical uplink shared channel (PUSCH) resource units (PRUs) based on a mapping constraint. The mapping constraint includes that one or more of the available PRUs are not used for the mapping, and that an integer number of the available random-access preambles are mapped to each of the available PRUs that are used for the mapping. Various examples of such mapping constraints were discussed above. The exemplary method can also include the operations of block 930, in which the network node can receive a data message transmitted by the UE on the PRU mapped to the detected random-access preamble.

In some embodiments, the available random-access preambles can be arranged into a plurality of first groups and the available PRUs can be arranged into a plurality of second groups. In such embodiments, the mapping constraint can include a one-to-one mapping between the first groups and the second groups (e.g., respective first groups mapped to respective second groups). In some of these embodiments, the detected random-access preamble is from a particular one of the first groups that is associated with a particular downlink signal quality measured by the UE (e.g., for DL RS).

In some embodiments, the mapping constraint can be associated with a mapping period (e.g., msgA association period or msgA association pattern period). Furthermore, during the mapping period, the available PRUs that are not used for the mapping occur after the available PRUs that are used for the mapping (e.g., at the end of the mapping period, as discussed above).

In some embodiments, at least one of the following depends on whether frequency hopping is enabled for the PUSCH: a number of the available PRUs that are not used for the mapping; and the integer number of the available random-access preambles mapped to each of the available PRUs that are used for the mapping. In this manner, different mapping ratios can be employed depending on whether frequency hopping is enabled on the PUSCH.

In some embodiments, the data message can be received (e.g., in block 930) on the PRU associated with the detected random-access preamble using one or more of the following: a lower power level relative to power levels for other available PRUs; a UE-specific spatial filter; and a UE-specific scrambling code.

In some embodiments, the data message can be received (e.g., in block 930) on the PRU associated with the detected random-access preamble without transmitting, to the UE, a response to the detected random-access preamble. In this manner, the network can facilitate the UE's two-step random access procedure rather than a conventional four-step random access procedure.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 10:
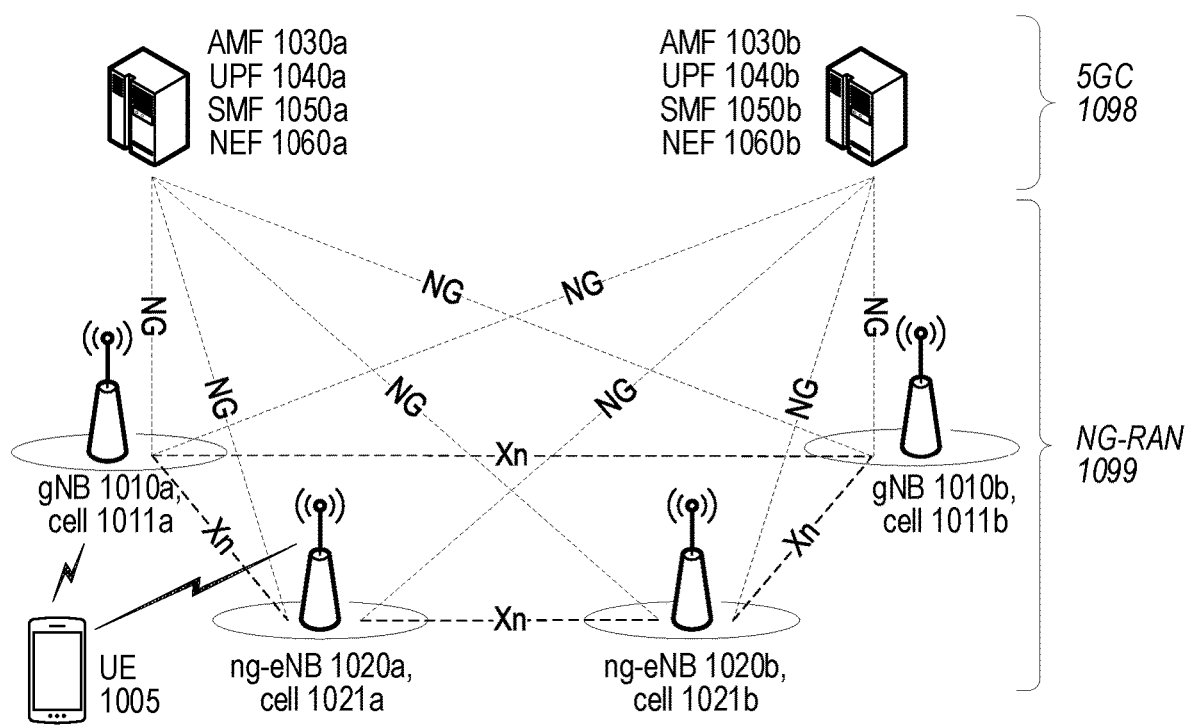
FIG. 10 shows a high-level view of an exemplary 5G network architecture.

FIG. 10 shows a high-level view of an exemplary 5G network architecture, including a Next Generation Radio Access Network (NG-RAN) 1099 and a 5G Core (5GC) 1098. As shown in the figure, NG-RAN 1099 can include gNBs 1010 (e.g., 1010a,b) and ng-eNBs 1020 (e.g., 1020a, b) that are interconnected with each other via respective Xn interfaces. The gNBs and ng-eNBs are also connected via the NG interfaces to 5GC 1098, more specifically to the AMF (Access and Mobility Management Function) 1030 (e.g., AMFs 1030a,b) via respective NG-C interfaces and to the UPF (User Plane Function) 1040 (e.g., UPFs 1040a,b) via respective NG-U interfaces. Moreover, the AMFs 1030a,b can communicate with one or more session management functions (SMFs, e.g., SMFs 1050a,b) and network exposure functions (NEFs, e.g., NEFs 1060a,b).

Each of the gNBs 1010 can support the NR radio interface including frequency division duplexing (FDD), time division duplexing (TDD), or a combination thereof. In contrast, each of ng-eNBs 1020 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 1011*a-b* and 1021*a-b* shown as exemplary in FIG. 10. The gNBs and ng-eNBs can also use various directional beams to provide coverage in the respective cells. Depending on the particular cell in which it is located, a UE 1005 can communicate with the gNB or ng-eNB serving that particular cell via the NR or LTE radio interface, respectively.

Each of the gNBs 1010*a,b* can include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above.

Each of gNBs 1010*a,b* shown in FIG. 10 can include a central (or centralized) unit (CU or gNB-CU) and one or more distributed (or decentralized) units (DU or gNB-DU). CUs are logical nodes that host higher-layer protocols and perform various gNB functions such controlling the operation of DUs. Likewise, DUs are logical nodes that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. A CU connects to its DUs over respective F1 logical interfaces.

Figure 11:
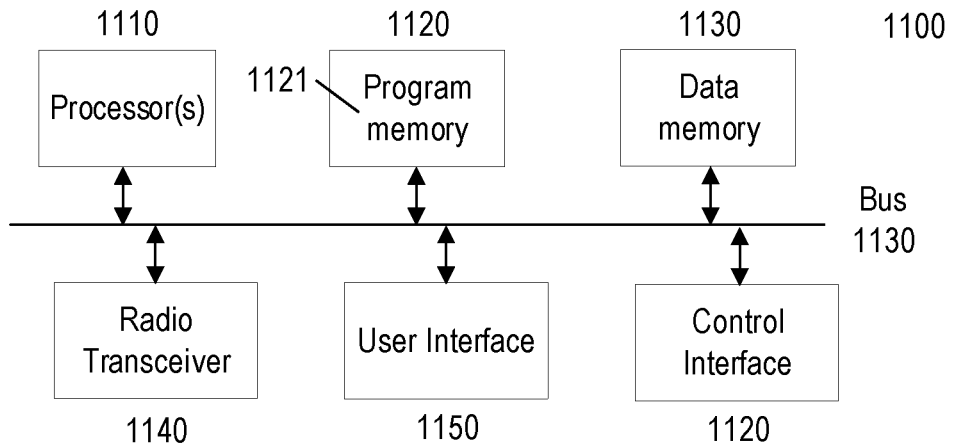
FIG. 11 shows a block diagram of an exemplary wireless device or UE, according to various exemplary embodiments of the present disclosure.

FIG. 11 shows a block diagram of an exemplary wireless device or user equipment (UE) 1100 (hereinafter referred to as "UE 1100") according to various embodiments of the present disclosure, including those described above with reference to other figures. For example, UE 1100 can be configured by execution of instructions, stored on a computer-readable medium, to perform operations corresponding to one or more of the exemplary methods and/or procedures described above.

UE 1100 can include a processor 1110 (also referred to as "processing circuitry") that can be operably connected to a program memory 1120 and/or a data memory 1170 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 11) that, when executed by processor 1110, can configure and/or facilitate UE 1100 to perform various operations, including operations described below. For example, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1120 that corresponds to MAC, RLC, PDCP, and RRC layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1120 that, together with radio transceiver 1140, implements device-to-device (D2D) communications with other compatible devices and/or UEs.

Program memory 1120 can also include software code executed by processor 1110 to control the functions of UE 1100, including configuring and controlling various components such as radio transceiver 1140, user interface 1150, and/or host interface 1160. Program memory 1120 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1120 can comprise an external storage arrangement (not shown) remote from UE 1100, from which the instructions can be downloaded into program memory 1120 located within or removably coupled to UE 1100, so as to enable execution of such instructions.

Data memory 1170 can include memory area for processor 1110 to store variables used in protocols, configuration, control, and other functions of UE 1100, including operations corresponding to, or comprising, any of the exemplary methods and/or procedures described herein. Moreover, program memory 1120 and/or data memory 1170 can include non-volatile memory (e.g., flash memory), volatile memory (e.g., static or dynamic RAM), or a combination thereof. Furthermore, data memory 1170 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1120 and data memory 1170 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like wireless communication standards and/or protocols. In some exemplary embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some exemplary embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some exemplary embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, 6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1120 in conjunction with, and/or supported by, data memory 1170.

User interface 1150 can take various forms depending on the particular embodiment of UE 1100, or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1100 having a touch screen display are capable of receiving user inputs, such as inputs related to exemplary methods and/or procedures described herein or otherwise known to persons of ordinary skill in the art.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the UE 1100 can take various forms depending on the particular exemplary embodiment of UE 1100 and of the particular interface requirements of other devices that the UE 1100 is intended to communicate with and/or control. For example, the control interface 1160 can comprise an RS-232 interface, an RS-4115 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the UE 1100, including various exemplary methods and/or computer-readable media according to various exemplary embodiments of the present disclosure.

Figure 12:
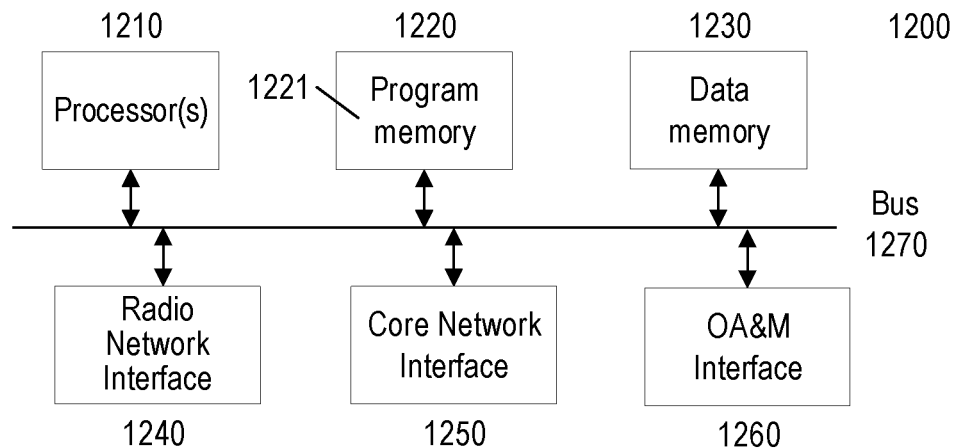
FIG. 12 shows a block diagram of an exemplary network node, according to various exemplary embodiments of the present disclosure.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods and/or procedures described above. In some exemplary embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, the functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations. For example, execution of such stored instructions can configure network node 1200 to communicate with one or more other devices using protocols according to various embodiments of the present disclosure, including one or more exemplary methods and/or procedures discussed above. Program memory 1220 can also comprise software code executed by processor 1210 that can facilitate and specifically configure network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1240 and core network interface 1250. By way of example and without limitation, core network interface 1250 can comprise the S1 interface and radio network interface 1240 can comprise the Uu interface, as standardized by 3GPP. Program memory 1220 can further comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some exemplary embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some embodiments, core network interface 1250 can comprise the NG interface standardized by 3GPP. In some exemplary embodiments, core network interface 1250 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1200 can include hardware and/or software that configures and/or facilitates network node 1200 to communicate with other network nodes in a RAN, such as with other eNBs, gNBs, ng-eNBs, en-gNBs, IAB nodes, etc. Such hardware and/or software can be part of radio network interface 1240 and/or core network interface 1250, or it can be a separate functional unit (not shown). For example, such hardware and/or software can configure and/or facilitate network node 1200 to communicate with other RAN nodes via the X2 or Xn interfaces, as standardized by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
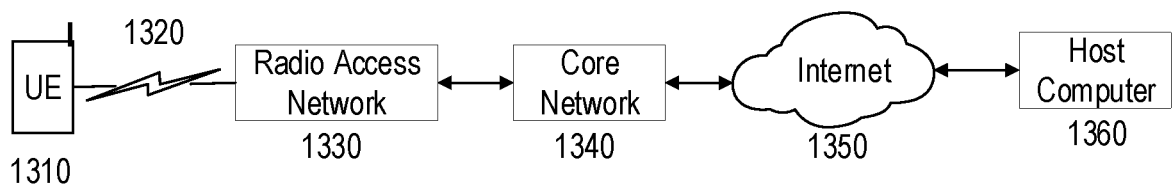
FIG. 13 shows a block diagram of an exemplary network configured to provide over-the-top (OTT) data services between a host computer and a UE, according to various exemplary embodiments of the present disclosure.

FIG. 13 is a block diagram of an exemplary communication network configured to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1250 described above. In some exemplary embodiments, RAN 1330 and core network 1340 can be configured and/or arranged as shown in other figures discussed above. For example, eNBs comprising an E-UTRAN 1330 can communicate with an EPC core network 1340 via an S1 interface, such as shown in FIG. 1. As another example, gNBs comprising a NR RAN 1330 can communicate with a 5GC core network 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques for mapping between random-access preambles (or sequences) and PUSCH resource units (PRUs) used by UEs during two-step random-access procedures toward a cell. Such techniques can reduce and/or eliminate latency and UE energy consumption associated with random-access attempts. Such techniques can also reduce and/or mitigate multi-user interference in RACH and/or PUSCH resources. When used in LTE or NR UEs (e.g., UE 1310) and eNBs or gNBs (e.g., gNBs comprising RAN 1330), exemplary embodiments described herein can provide various improvements, benefits, and/or advantages to OTT service providers and end-users, including more consistent data throughout and fewer delays without excessive UE power consumption, service interruptions, or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

E1. A method, performed by a user equipment (UE), for random-access to a cell in a wireless network, the method comprising:
  selecting one of a plurality of available random-access sequences, wherein:
    the selected random-access sequence is associated with a physical uplink shared channel (PUSCH) resource unit (PRU); and
    the selection of the random-access sequence is based on a mapping constraint between the available random access sequences and a plurality of available PRUs;
  transmitting the selected random-access sequence on a random access channel (RACH); and
  transmitting a data message on the PRU associated with the selected random-access sequence.

E2. The method of embodiment E1, further comprising receiving the mapping constraint via system information (SI) broadcast in the cell.

E3. The method of any of embodiments E1-E2, wherein:
  the selection is from a subset of the available random-access sequences; and
  the mapping constraint is that one or more of the available random-access sequences are invalidated for selection based on a desired mapping ratio between the subset of available random-access sequences and all available PRUs.

E4. The method of any of embodiments E1-E2, wherein:
  the selection is from all available random-access sequences; and
  all available random-access sequences are associated with a subset of the available PRUs.

E5. The method of embodiment E4, wherein the mapping constraint is that one or more of the available PRUs are invalidated based on a desired mapping ratio between all available random-access sequences and the subset of the available PRUs.

E6. The method of any of embodiments E3-E5, wherein the desired mapping ratio is an integer.

E7. The method of any of embodiments E3-E6, further comprising determining the desired mapping ratio based on whether frequency hopping is enabled for the PRU associated with the selected random-access sequence.

E8. The method of any of embodiments E1-E2, wherein:
  the mapping constraint is that the available random-access sequences are arranged into a first group and a second group;
  a first number of the first group are associated with a first PRU;
  a second number of the first group are associated with a second PRU, the second number being different than the first number.

E9. The method of embodiment E8, wherein selecting one of the available random-access sequences comprises:
  selecting the first group or the second group based on one or more of the following:
    UE measurement of downlink channel quality;
    size and/or priority of the data message;
    whether frequency-hopping is enabled for the PUSCH; and
    UE radio resource control (RRC) state.
  randomly selecting a random-access sequence from the selected group.

E10. The method of any of embodiments E1-E2, wherein:
  the mapping constraint is that the available PRUs are arranged into a first group and a second group; and
  selecting one of the available random-access sequences comprises:
    selecting the first group or the second group based on UE measurement of downlink channel quality; and
    randomly selecting a random-access sequence associated with the selected group.

E11. The method of any of embodiments E1-E2, wherein the mapping constraint comprises:
  the available random-access sequences are arranged into a first plurality of groups;
  the available PRUs are arranged into a second plurality of groups; and
  the mapping between the first plurality of groups and the second plurality of groups is one of the following: one-to-many, one-to-one, and many-to-one.

E12. The method of any of embodiments E1-E11, wherein the data message is transmitted on the PRU associated with the selected random-access sequence using one or more of the following:
  a lower transmit power level relative to transmit power levels for other available PRUs; and
  a UE-specific spatial code.

E13. A method, performed by a network node in a wireless network, for facilitating random-access by one or more user equipment (UEs) to a cell in the wireless network, the method comprising:
  monitoring a random access channel (RACH) for a plurality of random-access sequences that can be transmitted by UEs in the cell;
  monitoring a plurality of resource units (PRUs) of a physical uplink shared channel (PUSCH) for UE data messages associated with the plurality of random-access sequences; and
  selecting at least one of the plurality of random-access sequences and the plurality of PRUs based on a mapping constraint between all available random access sequences and all available PRUs.

E14. The method of embodiment E13, further comprising transmitting the mapping constraint via system information (SI) broadcast in the cell.

E15. The method of any of embodiments E13-E14, wherein:
  the plurality of random-access sequences is a subset of the available random-access sequences; and the mapping constraint is that one or more of the available random-access sequences are invalidated for selection based on a desired mapping ratio between the subset of available random-access sequences and all available PRUs.

E16. The method of any of embodiments E13-E14, wherein:
the plurality of random-access sequences includes all available random-access sequences; and
all available random-access sequences are associated with a subset of the available PRUs.

E17. The method of embodiment E16, wherein the mapping constraint is that one or more of the available PRUs are invalidated based on a desired mapping ratio between all available random-access sequences and the subset of the available PRUs.

E18. The method of any of embodiments E15-E17, wherein the desired mapping ratio is an integer.

E19. The method of any of embodiments E15-E18, further comprising determining the desired mapping ratio based on whether frequency hopping is enabled for the PUSCH.

E20. The method of any of embodiments E13-E14, wherein:
the mapping constraint is that the available random-access sequences are arranged into a first group and a second group;
a first number of the first group are associated with a first PRU;
a second number of the first group are associated with a second PRU, the second number being different than the first number.

E21. The method of embodiment E20, wherein the available random-access sequences are arranged into the first group and the second group based on one or more of the following:
downlink channel quality experienced by UEs;
size and/or priority of UE data messages;
whether frequency-hopping is enabled for the PUSCH; and
UE radio resource control (RRC) states.

E22. The method of any of embodiments E13-E14, wherein the mapping constraint is that the available PRUs are arranged into a first group and a second group based on downlink channel quality experienced by a UE.

E23. The method of any of embodiments E13-E14, wherein the mapping constraint comprises:
the available random-access sequences are arranged into a first plurality of groups;
the available PRUs are arranged into a second plurality of groups; and
the mapping between the first plurality of groups and the second plurality of groups is one of the following: one-to-many, one-to-one, and many-to-one.

E24. The method of any of embodiments E13-E23, wherein monitoring the PUSCH for UE data messages associated with the plurality of random-access sequences is based on one or more of the following:
lower transmit power levels for some of the plurality of PRUs relative to transmit power levels for other of the plurality of PRUs; and
UE-specific spatial codes.

E25. A user equipment (UE) configured for random-access to a cell in a wireless network, the UE comprising:

transceiver circuitry configured to communicate with a network node serving the cell; and
processing circuitry operatively coupled to the transceiver circuitry, whereby the processing circuitry and the transceiver circuitry are configured to perform operations corresponding to any of the methods of embodiments E1-E12.

E26. A user equipment (UE) configured for random-access to a cell in a wireless network, the UE being further arranged to perform operations corresponding to any of the methods of embodiments E1-E12.

E27. A non-transitory, computer-readable medium storing computer-executable instructions that, when executed by processing circuitry of a user equipment (UE), configure the UE to perform operations corresponding to any of the methods of embodiments E1-E12.

E28. A computer program product comprising computer-executable instructions that, when executed by processing circuitry of a user equipment (UE), configure the UE to perform operations corresponding to any of the methods of embodiments E1-E12.

E29. A network node, in a wireless network, configured to facilitate random-access by one or more user equipment (UEs) to a cell in the wireless network, the network node comprising:
radio network interface circuitry configured to communicate with the UEs; and
processing circuitry operatively coupled to the radio network interface circuitry, whereby the processing circuitry and the radio network interface circuitry are configured to perform operations corresponding to any of the methods of embodiments E13-E24.

E30. A network node, in a wireless network, configured to facilitate random-access by one or more user equipment (UEs) to a cell in the wireless network, the network node being further arranged to perform operations corresponding to any of the methods of embodiments E13-E24.

E31. A non-transitory, computer-readable medium storing computer-executable instructions that, when executed by processing circuitry of a network node in a wireless network, configure the network node to perform operations corresponding to any of the methods of embodiments E13-E24.

E32. A computer program product comprising computer-executable instructions that, when executed by processing circuitry of a network node in a wireless network, configure the network node to perform operations corresponding to any of the methods of embodiments E13-E24.

The invention claimed is:
1. A method for user equipment (UE) random access to a cell in a wireless network, the method comprising:
selecting one of a plurality of available random-access preambles;
mapping the selected random-access preamble to one of a plurality of available physical uplink shared channel (PUSCH) resource units (PRUs) based on a mapping constraint that comprises:
one or more of the available PRUs are not used for the mapping, and
an integer number of the available random-access preambles are mapped to each of the available PRUs that are used for the mapping;
transmitting the selected random-access preamble on a random access channel (RACH); and transmitting a data message on the PRU to which the selected random-access preamble is mapped.

2. The method of claim 1, wherein:
the available random-access preambles are arranged into a plurality of first groups;
the available PRUs are arranged into a plurality of second groups; and
the mapping constraint includes a one-to-one mapping between the first groups and the second groups.

3. The method of claim 2, wherein selecting one of the available random-access preambles comprises:
selecting one of the first groups based on a UE measurement of downlink signal quality; and
randomly selecting a random-access preamble from the selected first group.

4. The method of claim 1, wherein:
the mapping constraint is associated with a mapping period; and
during the mapping period, the available PRUs that are not used for the mapping occur after the available PRUs that are used for the mapping.

5. The method of claim 1, wherein at least one of the following depends on whether frequency hopping is enabled for the PUSCH:
how many of the available PRUs are not used for the mapping; and
the integer number of the available random-access preambles mapped to each of the available PRUs that are used for the mapping.

6. The method of claim 1, wherein the data message is transmitted on the PRU to which the selected random-access preamble is mapped, using one or more of the following:
a lower power level relative to power levels for other available PRUs;
a UE-specific spatial filter; and
a UE-specific scrambling code.

7. The method of claim 1, wherein the data message is transmitted on the PRU to which the selected random-access preamble is mapped without receiving a response, from the wireless network, to the transmission of the selected random-access preamble.

8. A non-transitory, computer-readable medium storing computer-executable instructions that, when executed by processing circuitry of a user equipment, UE configured for random access to a cell in a wireless network, configure the UE to perform operations corresponding to the method of claim 1.

9. A method for a network node to facilitate user equipment (UE) random access to a cell in a wireless network, the method comprising:
detecting a random-access preamble transmitted by a UE on a random access channel (RACH);
mapping the detected random-access preamble to one of a plurality of available physical uplink shared channel (PUSCH) resource units (PRUs) based on a mapping constraint that comprises:
one or more of the available PRUs are not used for the mapping, and
an integer number of the available random-access preambles are mapped to each of the available PRUs that are used for the mapping; and
receiving a data message transmitted by the UE on the PRU to which the detected random-access preamble is mapped.

10. The method of claim 9, wherein:
the available random-access preambles are arranged into a plurality of first groups;
the available PRUs are arranged into a plurality of second groups; and
the mapping constraint includes a one-to-one mapping between the first groups and the second groups.

11. The method of claim 10, wherein the detected random-access preamble is from a particular one of the first groups that is associated with a particular downlink signal quality measured by the UE.

12. The method of claim 9, wherein:
the mapping constraint is associated with a mapping period; and
during the mapping period, the available PRUs that are not used for the mapping occur after the available PRUs that are used for the mapping.

13. The method of claim 9, wherein at least one of the following depends on whether frequency hopping is enabled for the PUSCH:
how many of the available PRUs are not used for the mapping; and
the integer number of the available random-access preambles mapped to each of the available PRUs that are used for the mapping.

14. The method of claim 9, wherein the data message is received on the PRU to which the detected random-access preamble is mapped, according to one or more of the following:
a lower power level relative to power levels for other available PRUs;
a UE-specific spatial filter; and
a UE-specific scrambling code.

15. The method of claim 9, wherein the data message is received on the PRU to which the detected random-access preamble is mapped without transmitting, to the UE, a response to the detected random-access preamble.

16. A non-transitory, computer-readable medium storing computer-executable instructions that, when executed by processing circuitry of a network node configured to facilitate user equipment (UE) random access to a cell in a wireless network, configure the network node to perform operations corresponding to the method of claim 9.

17. A user equipment (UE) configured for random access to a cell in a wireless network, the UE comprising:
radio transceiver circuitry configured to communicate with a network node serving the cell; and
processing circuitry operatively coupled to the radio transceiver circuitry, whereby the processing circuitry and the radio transceiver circuitry are configured to:
select one of a plurality of available random-access preambles;
map the selected random-access preamble to one of a plurality of available physical uplink shared channel (PUSCH) resource units (PRUs) based on a mapping constraint that comprises:
one or more of the available PRUs are not used for the mapping, and
an integer number of the available random-access preambles are mapped to each of the available PRUs that are used for the mapping;
transmit the selected random-access preamble on a random access channel (RACH); and
transmit a data message on the PRU to which the selected random-access preamble is mapped.

18. The UE of claim 17, wherein:
the available random-access preambles are arranged into a plurality of first groups;
the available PRUs are arranged into a plurality of second groups; and the mapping constraint includes a one-to-one mapping between the first groups and the second groups.

19. The UE of claim 18, wherein the processing circuitry and the radio transceiver circuitry are configured to select one of the available random-access preambles based on:
   selecting one of the first groups based on a UE measurement of downlink signal quality; and
   randomly selecting a random-access preamble from the selected first group.

20. The UE of claim 17, wherein:
   the mapping constraint is associated with a mapping period; and
   during the mapping period, the available PRUs that are not used for the mapping occur after the available PRUs that are used for the mapping.

21. The UE of claim 17, wherein at least one of the following depends on whether frequency hopping is enabled for the PUSCH:
   how many of the available PRUs are not used for the mapping; and
   the integer number of the available random-access preambles mapped to each of the available PRUs that are used for the mapping.

22. A network node configured to facilitate user equipment (UE) random access to a cell in a wireless network, the network node comprising:
   radio network interface circuitry configured to communicate with UEs; and
   processing circuitry operatively coupled to the radio network interface circuitry, whereby the processing circuitry and the radio network interface circuitry are configured to:
      detect a random-access preamble transmitted by a UE on a random access channel (RACH);
      map the detected random-access preamble to one of a plurality of available physical uplink shared channel (PUSCH) resource units (PRUs) based on a mapping constraint that comprises:
         one or more of the available PRUs are not used for the mapping, and
         an integer number of the available random-access preambles are mapped to each of the available PRUs that are used for the mapping; and
      receive a data message transmitted by the UE on the PRU to which the detected random-access preamble is mapped.

23. The network node of claim 22, wherein:
   the available random-access preambles are arranged into a plurality of first groups;
   the available PRUs are arranged into a plurality of second groups; and
   the mapping constraint includes a one-to-one mapping between the first groups and the second groups.

24. The network node of claim 22, wherein:
   the mapping constraint is associated with a mapping period; and
   during the mapping period, the available PRUs that are not used for the mapping occur after the available PRUs that are used for the mapping.

25. The network node of claim 22, wherein at least one of the following depends on whether frequency hopping is enabled for the PUSCH:
   how many of the available PRUs are not used for the mapping; and
   the integer number of the available random-access preambles mapped to each of the available PRUs that are used for the mapping.

* * * * *